United States Patent
Shinozaki

(10) Patent No.: US 7,843,579 B2
(45) Date of Patent: Nov. 30, 2010

(54) ELECTRONIC DOCUMENT MANAGEMENT SYSTEM, DISCARD PROCESSING DEVICE, AND DISCARD PROCESSING METHOD

(75) Inventor: Kengo Shinozaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 994 days.

(21) Appl. No.: 11/324,235

(22) Filed: Jan. 4, 2006

(65) Prior Publication Data

US 2007/0046975 A1 Mar. 1, 2007

(30) Foreign Application Priority Data

Aug. 30, 2005 (JP) ............................. 2005-250291

(51) Int. Cl.
G06F 15/00 (2006.01)
G06K 1/00 (2006.01)
G06K 15/00 (2006.01)
G06F 3/12 (2006.01)

(52) U.S. Cl. ..................................... 358/1.14; 358/1.13

(58) Field of Classification Search ................ 358/1.14, 358/403; 382/309, 311, 289, 296, 176, 7, 382/57

See application file for complete search history.

(56) References Cited

U.S. PATENT DOCUMENTS

| 5,813,009 | A * | 9/1998 | Johnson et al. ............. 707/100 |
| 5,974,199 | A * | 10/1999 | Lee et al. .................... 382/289 |
| 6,115,509 | A * | 9/2000 | Yeskel ........................ 382/309 |
| 2003/0146275 | A1 * | 8/2003 | Bennett et al. .............. 235/376 |
| 2006/0285147 | A1 * | 12/2006 | Wolfman et al. ........... 358/1.14 |

FOREIGN PATENT DOCUMENTS

JP A-2000-293303 10/2000
JP A-2005-190365 7/2005

* cited by examiner

*Primary Examiner*—Douglas Q Tran
(74) *Attorney, Agent, or Firm*—Morgan, Lewis & Bockius LLP

(57) ABSTRACT

An electronic document management system includes: a reading unit that reads a code image from a document in which the code image is formed; an analysis unit that analyzes code information from the code image read by the reading unit; and a discard processing unit that executes discard processing of the document if the code information is correctly analyzed by the analysis unit, and does not execute discard processing of the document if the code information is not correctly analyzed.

17 Claims, 7 Drawing Sheets

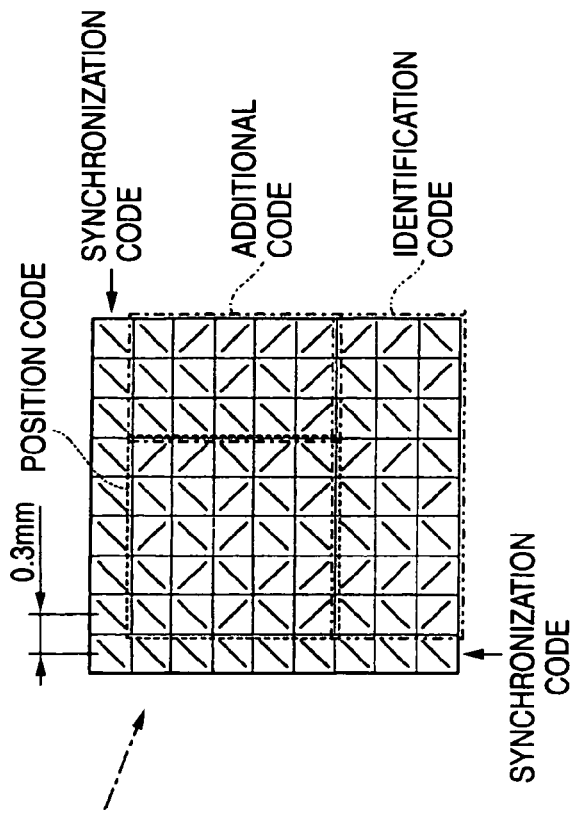
FIG. 4A
FIG. 4B
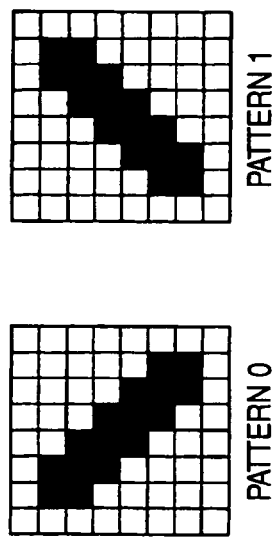
FIG. 4C

ACCESS LIMITATION
COPY TRANSMISSION
DISCARD LIMITATION
PRINT PROHIBITION

| IDENTIFICATION INFORMATION | STORAGE POSITION | ADDITIONAL INFORMATION ||||| DISCARD LOG |
|---|---|---|---|---|---|---|
| | | USER ID | PASSWORD | NAMING RULE | DISCARD MANAGEMENT | |
| 000000001 | aaa | USER1 | pw1 | - | - | ... |
| 000000002 | bbb | - | - | @_NEW | - | ... |
| 000000003 | ccc | - | - | - | SHREDDER1 | ... |
| 000000004 | ddd | USER4 | pw4 | - | - | ... |
| 000000005 | eee | USER5 | pw5 | - | 2007/08/25 | ... |
| ⋮ | ⋮ | ⋮ | ⋮ | ⋮ | ⋮ | ⋮ |

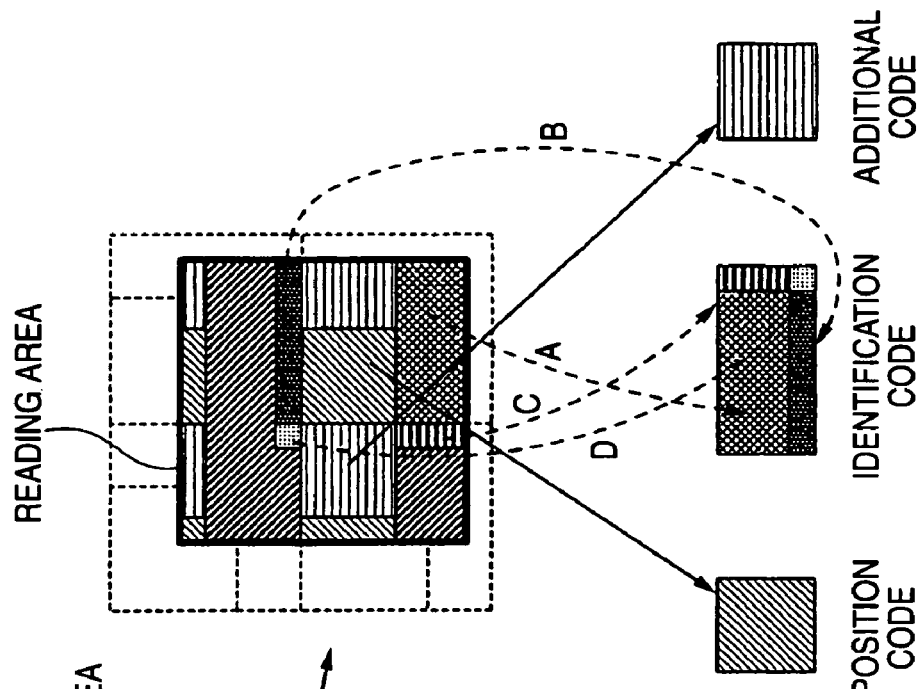
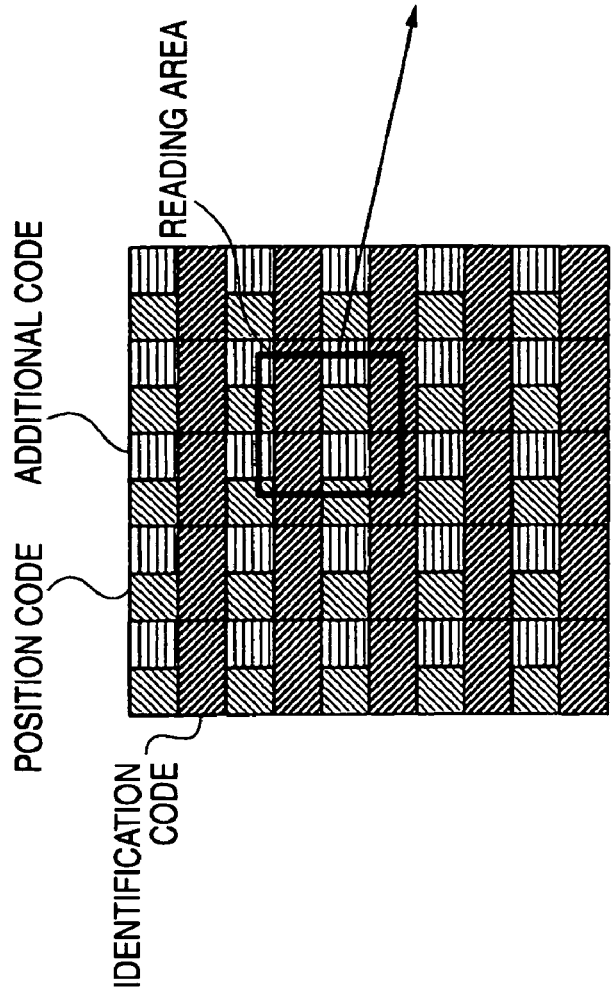

ELECTRONIC DOCUMENT MANAGEMENT SYSTEM, DISCARD PROCESSING DEVICE, AND DISCARD PROCESSING METHOD

BACKGROUND OF THE INVENTION

1. Field of the Invention

This invention relates to an electronic document management system or the like that manages an electronic document of a document image formed on a medium, and more particularly to an electronic document management system or the like that reads a code image formed on a medium.

2. Description of the Related Art

Recently, a technique of writing characters or drawing pictures on a special sheet on which minutes dots have been printed, allowing a user to transfer the data of characters or the like written on the sheet to a personal computer, portable telephone or the like, and enabling execution of various applications such as saving the contents of the data, sending them by e-mail has been noted. In this technique, small dots are printed at a spacing of, for example, approximately 0.3 mm, on this special sheet, and these dots draw patterns that differ, for example, from grid to grid of a predetermined size. By reading these patterns, for example, by using a dedicated pen containing a digital camera, it becomes possible to specify the positions of the characters or the like written on this special sheet and to use such characters or the like as electronic information.

SUMMARY OF THE INVENTION

This invention has been made in view of the above circumstances and provides an electronic document management system.

According to an aspect of this invention, an electronic document management system includes: a reading unit that reads a code image from a document in which the code image is formed; an analysis unit that analyzes code information from the code image read by the reading unit; and a discard processing unit that executes discard processing of the document if the code information is correctly analyzed by the analysis unit, and does not execute discard processing of the document if the code information is not correctly analyzed.

BRIEF DESCRIPTION OF THE DRAWINGS

Embodiments of the invention will be described in detail based on the following figures, wherein:

FIGS. 4A to 4C show an exemplary two-dimensional code image formed on a medium;

FIGS. 6A and 6B are views for explaining reading of code information in a limited detection area.

DETAILED DESCRIPTION OF THE INVENTION

Hereinafter, an embodiment of this invention will be described in detail with reference to the attached drawings.

Figure 1:
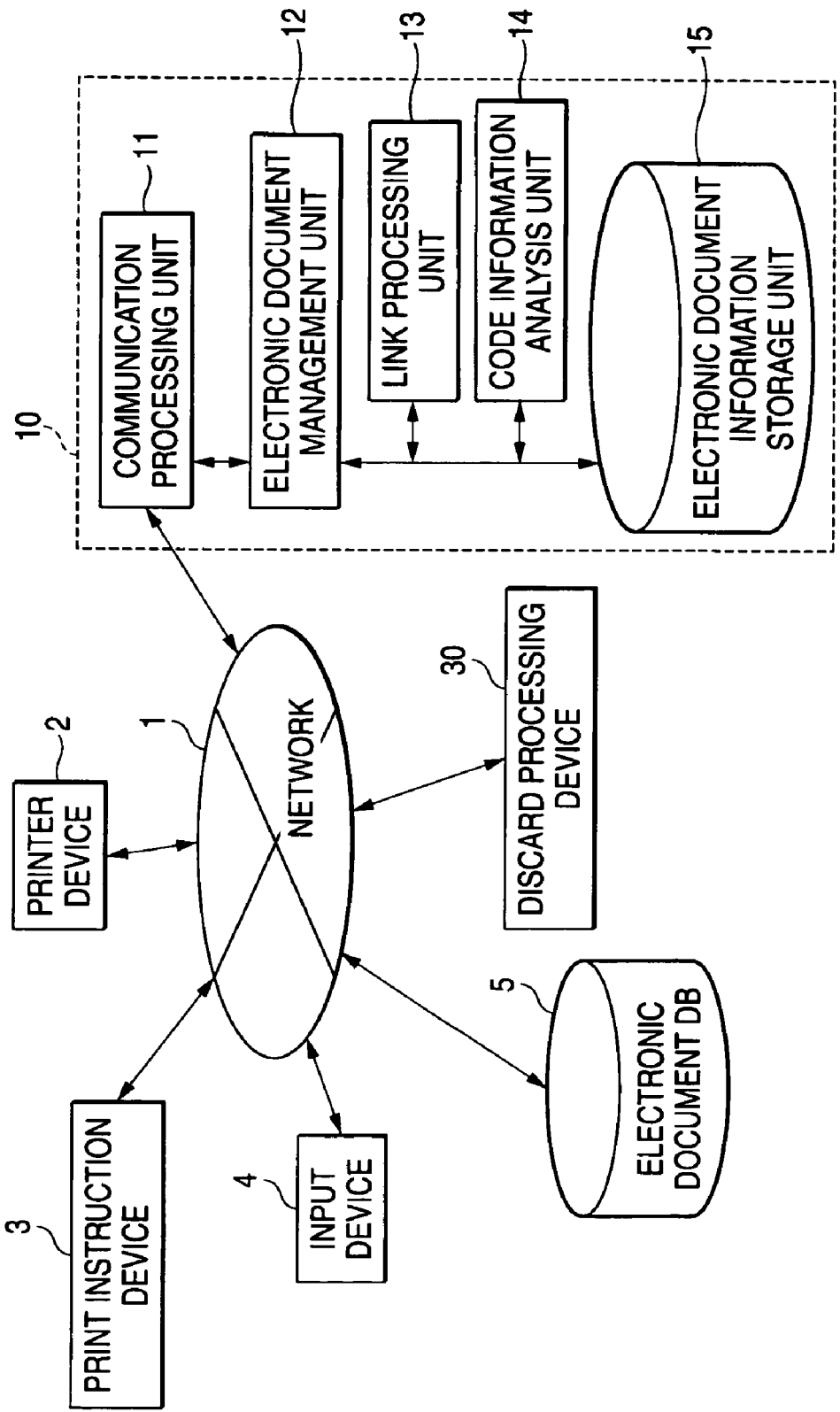
FIG. 1 shows an overall construction of an electronic document management system to which an embodiment of the invention is applied.

FIG. 1 shows an overall construction of an electronic document management system to which this embodiment is applied. In this electronic document management system, various devices are connected to a network 1 such as the Internet. Here, the system includes a printer device 2 that prints a document image and a code image in a superposing manner, and a print instruction device 3 that outputs to the printer device 2 a print instruction designating an electronic document to be the basis of a document image. The system also includes an input device 4 that reads a document image and a code image from a medium on which the document image and the code image are superposed, and an electronic document database (DB) 5 that stores an electronic document in association with, for example, identification information (document ID). The system further includes an electronic document management device 10 that manages electronic documents, and a discard processing device 30 such as shredder that shreds, for example, a paper medium on which a document image is printed. As the discard processing device 30, it is possible to employ a technique of causing the document image or the like to disappear from the medium, other than shredding as in a shredder.

The printer device 2 forms a document image on a medium (paper surface) using colored toner or colored ink of YMCK, for example, in accordance with an electrophotographic system or ink jet system. In the printer device 2, also a code image is superposed and printed on this medium (paper surface) using invisible toner, which will be described later. The print instruction device 3 is formed by, for example, a personal computer (PC). The print instruction deice 3 reads out an electronic document stored in the electronic document database (DB) 5, for example, using URL (Uniform Resource Locators), and outputs a print instruction to the printer device 2. The information of the print instruction from the print instruction device 3 is transferred to the electronic document management device 10 via the network 1. Meanwhile, the input device 4 can be constructed to scan a medium (paper surface) as a reading subject in a sub scanning direction by using a sensor, for example, extending in a main scanning direction, and thus to read a document image and a code image. The input device 4 can also be constructed by using, for example, a pen-type input device and a predetermined personal computer. This pen-type input device has a communication function to communicate with the predetermined personal computer, and a code reading function or the like to cast, for example, infrared rays onto the printed medium and read a code image including, for example, X-coordinate and Y-coordinate from a two-dimensional code on the medium. With this communication function, the read code information on the medium and the like are sent. For this communication, connection via a cable to an interface such as USB (Universal Serial Bus), wireless LAN, RS-232C, which is a serial interface standard, or Bluetooth, which is a short-distance wireless transmission technique, can be used.

The electronic document management device 10 includes a communication processing unit 11 that communicates with an external device via the network 1, and an electronic document management unit 12 that manages the correspondence between a generated address and an electronic document. The electronic document management device 10 also includes a link processing unit 13 that executes processing related to link information set for an electronic document. The electronic document management device 10 further includes a code information analysis unit 14 that analyzes code information acquired by decoding a code image. The electronic document management device 10 also includes an electronic document information storage unit 15 that stores the correspondence between an electronic document, its address information, identification information (ID) of the electronic document, identification information of the medium, attribute information and the like.

Next, the discard processing device 30 will be described.

Figure 2:
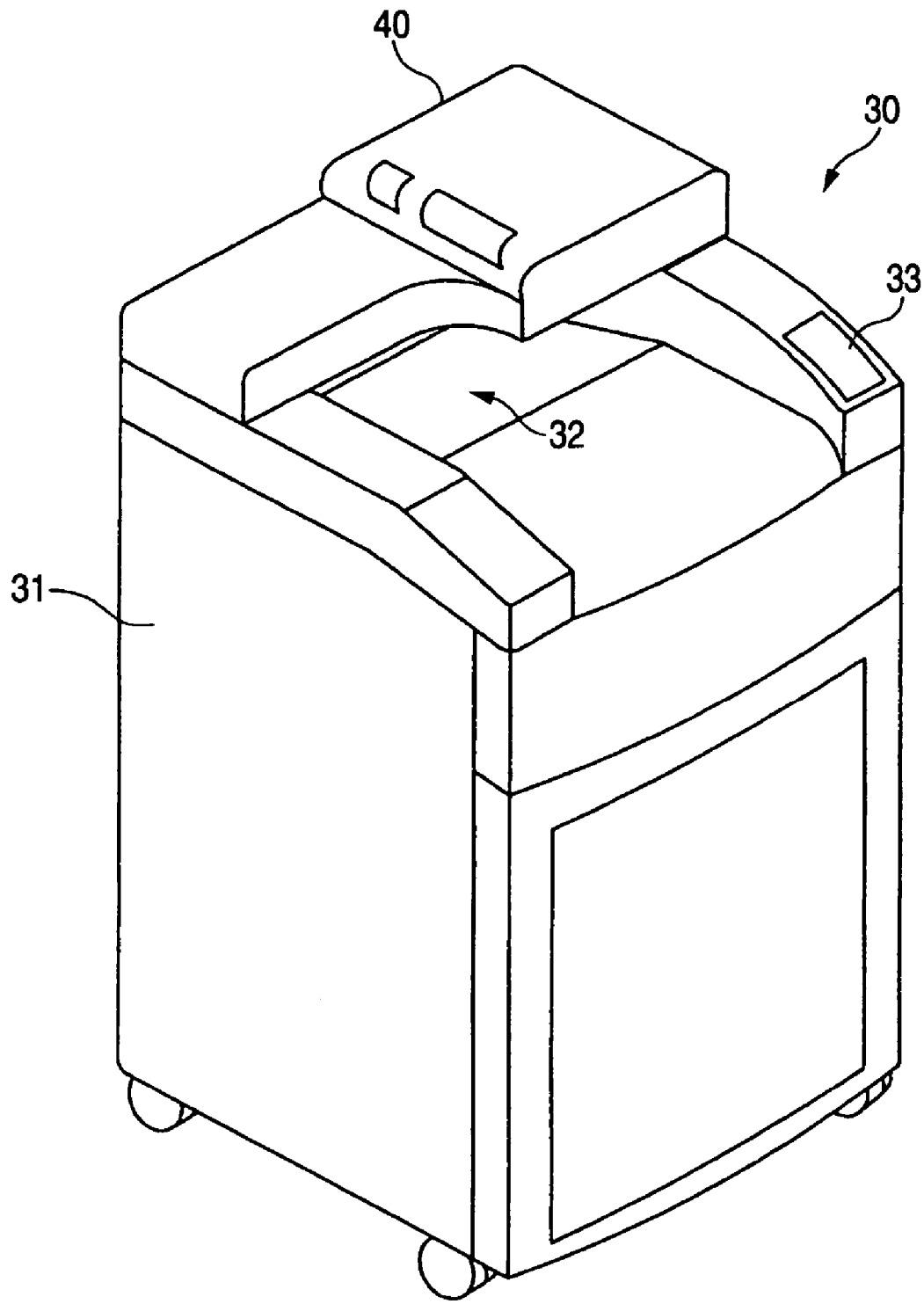
FIG. 2 is a perspective view showing an appearance of a discard processing device.

FIG. 2 is a perspective view showing an appearance of the discard processing device 30. The discard processing device 30 shown in FIG. 2 has a body 31 in which a cutter for cutting a medium (paper) to be discarded is housed. This body 31 has an entry port 32 through which the medium (paper) is fed into the body 31, and a control panel 33 that displays various types of information to a user and accepts inputs from the user. In this embodiment, an information input unit 40 is installed at the top of the body 31 and near the entry port 32.

Figure 3:
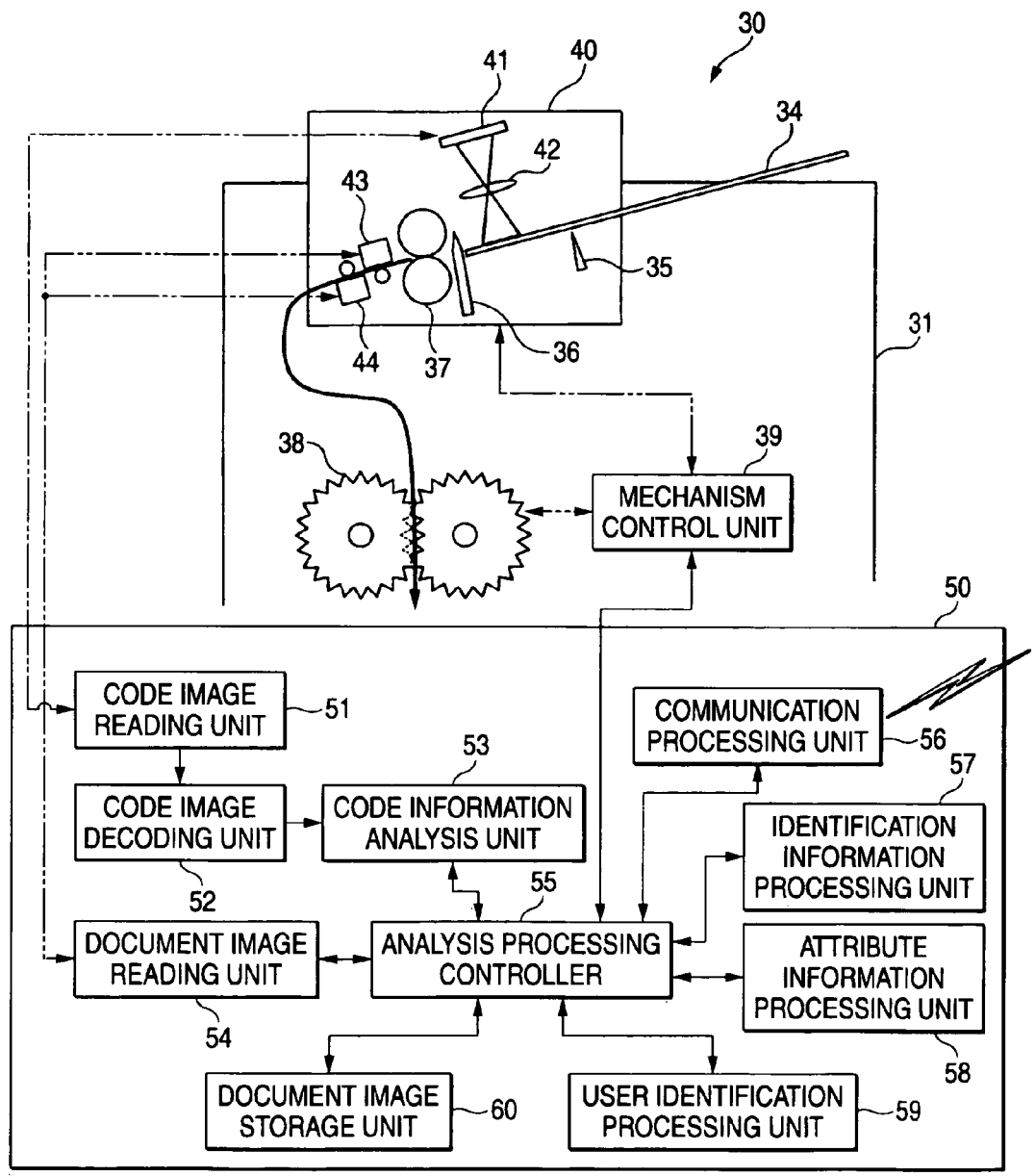
FIG. 3 is a view for explaining the functions of the discard processing device shown in FIG. 2.

FIG. 3 is a view for explaining the functions of the discard processing device 30 shown in FIG. 2. A discard sheet tray 34 is provided in the entry port 32 (see FIG. 2) of the body 31 of the discard processing device 30. A sheet sensor 35 that recognizes the existence of a sheet (medium) as a discard subject is provided near the discard sheet tray 34, and a gate 36 that stops the sheet (medium) as a discard subject is provided at the edge in the sheet entry direction of the discard sheet tray 34. A feeder 37 that transports the sheet (medium) when the gate 36 is opened is provided downstream from the gate 36. Moreover, a rotating cutting edge array 38 that shreds the entered sheet (medium) as a discard subject is provided downstream from the feeder 37. Furthermore, a mechanism controller 39 is provided that performs control of various mechanism units of the discard processing device 30 and display control or the like of the control panel 33 shown in FIG. 2.

Meanwhile, the information input unit 40 includes an area sensor 41 that reads a code image formed on the sheet (medium) as a discard subject, and an optical system 42 for forming the code image on the area sensor 41. The information input unit 40 also includes a first line sensor 43 that reads a document image or the like formed on a first surface (for example, face) of the sheet (medium) as a discard subject, and a second line sensor 44 that reads a document image or the like formed on a second surface of this sheet (medium).

The discard processing device 30 also has a controller 50 that performs characteristic processing in this embodiment. This controller 50 has a code image reading unit 51 that controls the area sensor 41 and reads a code image outputted from the area sensor 41, a code image decoding unit 52 that decodes the code image read by the code image reading unit 51, and a code information analysis unit 53 that analyzes code information (code signal, code data) acquired by the decoding. The controller 50 also has a document image reading unit 54 that controls the first line sensor 43 and the second line sensor 44 and reads images outputted from these sensors. The controller 50 also has an analysis processing controller 55 that executes various analysis processing based on the code information analyzed by the code information analysis unit 53. Moreover, the controller 50 has a communication processing unit 56 that communicates with an external device via the network 1 as shown in FIG. 1, an identification information processing unit 57 that processes identification information such as document identification information of an electronic document and medium identification information for univocally specifying a medium, and an attribute information processing unit 58 that processes attribute information (which will be described later). The controller 50 also has a user identification processing unit 59 that performs processing to identify a user or the like who operates the discard processing device 30. A document image storage unit 60 that stores read document images may also be provided.

Now, a code image read by the code image reading unit 51 shown in FIG. 3 and the input device 4 shown in FIG. 1 will be described.

FIGS. 4A to 4C show an exemplary two-dimensional code image formed on a medium. There is a form of code image that is read by the code image reading unit 51 and the input device 4 and is generated when the printer device 2 shown in FIG. 1 performs printing. FIG. 4A shows a grid for schematically showing each unit of a two-dimensional code image formed and arranged as invisible image. FIG. 4B shows a unit of a two-dimensional code image acquired by recognizing the invisible image by irradiation with infrared rays. FIG. 4C shows slant line patterns of "back slash" and slash "/".

The two-dimensional code image formed on the medium as shown in FIGS. 4A to 4C is formed by, for example, invisible toner having maximum absorptance of 7% or less in a visible ray zone (400 to 700 nm) and absorptance of 30% or more in a near infrared zone (800 to 1000 nm). For this invisible toner, invisible toner having an average dispersion diameter of 100 to 600 nm is employed in order to increase the near infrared absorption capability that is necessary for machine reading of the image. Here, the terms "visible" and "invisible" do not refer to whether the image is visually recognizable or not. The image formed on the printed medium is distinguished as being "visible" or "invisible" in accordance with whether the image is recognizable on the basis of the presence of coloring property due to absorption of a specific wavelength in the visible ray zone.

The two-dimensional code image shown in FIGS. 4A to 4C is formed as an invisible image that can be machine-read by irradiation with infrared rays and that can be decoded in a stable state for a long period, and from which information can be recorded at a high density. It is also possible to provide the two-dimensional code image in an arbitrary area irrespective of an area where a visible image is provided on the medium surface that outputs the image. Moreover, the two-dimensional code image may be recognized by gloss difference when it is visually viewed.

The two-dimensional code pattern shown in FIG. 4B includes an area where a position code indicating a coordinate position on a medium is stored, an area where an identification code for univocally specifying an electronic document or print medium is stored, and an area where an additional code used for user AP (application) is stored. The two-dimensional code pattern also includes an area where a synchronization code is stored. Plural two-dimensional code patterns as shown in FIG. 4B are arranged on a surface of a medium (paper surface) as shown in FIG. 4A, and each of the two-dimensional code patterns includes a position code, an additional code, an identification code and a synchronization code. In the plural position code areas, different position information is stored in accordance with the positions where the patterns are arranged. On the other hand, in the plural identification code areas and additional code areas, the same identification information and additional information are stored irrespective of the positions where the patterns are arranged.

In FIG. 4B, the position code is arranged in a rectangular area of 5 bits by 5 bits. The individual bit values are formed in a bit map of plural minute lines having different rotation angles. The slant line patterns (pattern 0 and pattern 1) shown in FIG. 4C represent bit value 0 and bit value 1. More specifically, bit 0 and bit 1 are represented by using "back slash"

and slash "/" having different slopes from each other. Each of the slant line patterns is formed with a size of 8 by 8 pixels at 600 dpi. The slant line pattern with its left side up (pattern 0) represents bit value 0, and the slant line pattern with its right side up (pattern 1) represents bit value 1. Therefore, the information of one bit (0 or 1) can be expressed by a single slant line pattern. Using such a minute line bit map including the two types of lines, a two-dimensional code pattern is provided that causes very small noise to a visible image and that can digitize and embed a large volume of information at a high density.

In the position code area shown in FIG. 4B, position information of 25 bits in total is stored. Of these 25 bits, 12 bits can be used for encoding the X-coordinate and 12 bits can be used for encoding the Y-coordinate. As all the 12 bits are used for encoding positions, $2^{12}$ (=4096) positions can be encoded. In the case that each slant line pattern is formed by 8 pixels by 8 pixels (600 dpi) as shown in FIG. 4C, one dot of 600 dpi has a size of 0.0423 mm. Therefore, the size of the two-dimensional code (including the synchronization code) shown in FIG. 4B is approximately 3 mm both vertically and horizontally (8 pixels×9 bits×0.0423 mm). When 4096 positions are encoded at a spacing of 3 mm, a length of approximately 12 m can be encoded. In this manner, all the 12 bits can be used for encoding positions. Alternatively, if an error occurs in the detection of the slant line pattern, redundant bit(s) for error detection and error correction may be included.

The identification code is arranged in a rectangular area of 3 bits by 8 bits and can store identification information of 24 bits in total. In the case that 24 bits are used as identification information, $2^{24}$ patterns (=approximately 17 million patterns) of identification information can be expressed. As in the case of the position code, the identification code can include redundant bit(s) for error detection and error correction in the 24 bits.

Meanwhile, the additional code is arranged in a rectangular area of 5 bits by 3 bits and can store attribute information of 15 bits in total. In the case that 15 bits are used as attribute information, $2^{15}$ patterns (=approximately 33,000 patterns) of attribute information can be expressed. As in the case of the identification code and the position code, the additional code can include redundant bit(s) for error detection and error correction in the 15 bits.

Figures 5A, 5B:
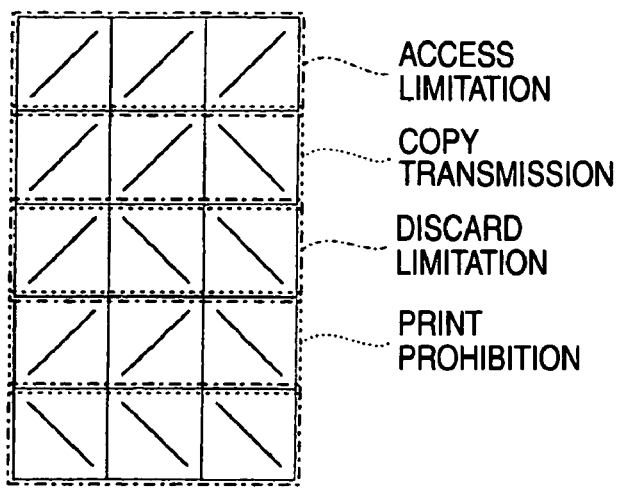
FIGS. 5A and 5B are explanatory views for explaining additional codes.

FIGS. 5A and 5B are explanatory views for explaining the additional code. FIG. 5A shows the area where the additional code is arranged, further in detail. FIG. 5B shows an example of storage contents of second additional information that cannot be included in the code image. The storage contents of this second additional information are stored into the electronic document information storage unit 15 (see FIG. 1) as a database.

The attribute information-included in the additional code shown in FIG. 5A is properly decided in accordance with the user AP. In FIG. 5A, access limitation, copy transmission, discard limitation and print prohibition (copy prohibition) are set. Since the quantity of information that can be included in the additional code is limited, more detailed additional information (second additional information) can be stored as the storage contents as shown in FIG. 5B and information to refer to this database (electronic document information storage unit 15) can be embedded in the additional code.

In the case of the exemplary additional code shown in FIG. 5A, for example, whether to control each item of access limitation, copy transmission, discard limitation and print prohibition (copy prohibition) is expressed by the first bit. Then, the storage position of the second additional information in the electronic document information storage unit 15 is expressed by the second and third bits. In this embodiment, for access limitation and copy transmission, user ID, password and naming rule are provided as the second additional information. For discard limitation, user ID, password and discard management are provided as the second additional information. However, for print prohibition, whether to prohibit print or not is set and no second additional information exists.

As shown in FIG. 5B, the electronic document information storage unit 15 stores as a second additional information the correspondence or the like among the identification information, the storage position of the electronic document, and the second additional information. Here, since access limitation requires a user ID and password as the second additional information, these items of information are stored. Specifically, it is defined that an electronic document at a storage position "aaa" can be accessed when user ID "user1" and password "pw1" are inputted. Also, since copy transmission requires a naming rule, such information is stored. Specifically, it is defined that an electronic document at a storage position "bbb" should be copied before being transmitted and that the file name of the original electronic document followed by "@_new" should be transmitted as the file name of the copied electronic document.

In the case that all the additional information can be embedded in the code image, only the correspondence between the identification information and the storage position is stored and no correspondence with the additional information is made.

Here, as the attribute information of discard management included in the additional code, the contents of discard management can be included in the second additional information, such as specification of the discard processing device 30 that executes discard processing, specification of the user that executes discard processing, and management corresponding to the discard period. Also, information related to discard log can be included in the second additional information.

In the example shown in FIG. 5B, at identification number "000000003", "shredder1" is specified as a shredder (discard processing device 30 or the like) that performs discard processing, and only this "shredder1" is allowed to perform discard processing. At identification number "000000005", "2007/08/25" is stored as a discard period. In the management corresponding to this discard period, for example, a document can be freely discarded if its confidential term "2007/08/25" is expired, but discard of a document needs authentication if the confidential term is not expired. In the item "discard log", for example, information of the date and time when a document is discarded, information of the type of the machine that executes discard processing and the like are stored.

Next, a case of reading the two-dimensional code image shown in FIG. 4 by the area sensor 41 shown in FIG. 3 will be described.

FIGS. 6A and 6B are views for explaining the reading of code information in a limited detection area. As shown in FIG. 6A, plural position codes (codes corresponding to position information), plural identification codes (codes corresponding to identification information), and plural additional codes (codes corresponding to attribute information) are arranged two-dimensionally on a printed medium. In FIG. 6A, synchronization codes are not shown for convenience in the explanation. As described above, the plural position codes store different position information in accordance with the position where the code is arranged, and the plural identification codes and the plural additional codes store the same identification information and attribute information irrespective of the position where the code is arranged.

It is now assumed that the reading area of an invisible image to be read by the area sensor 41 of the information input unit 40 attached to the discard processing device 30 is indicated by bold lines in FIG. 6A. An enlarged view of the vicinity of this reading area is shown in FIG. 6B. The position codes store different information in accordance with the position within the image. Therefore, unless at least one position code is included in the read image, the position code cannot be detected. However, since all the identification codes and additional codes store the same identification information and attribute information irrespective of the position within the image, these codes can be reconstructed from fragmentary information. In the code image reading unit 51 (see FIG. 3), one identification code is reconstructed, for example, by combining four partial codes (A, B, C, D) in the reading area, as shown in FIG. 6B.

The reading of an identification code and the reading of an additional code can also be realized by other devices than the area sensor 41 of the information input unit 40. For example, using a pen-type input device as the input device 4 (see FIG. 1), the identification information and attribute information are recognized. More specifically, infrared rays are cast onto the medium (sheet) from an infrared casting part provided at the edge of the pen and reflected infrared rays are received, thus recognizing the code image. Also in such a case, the code image can be read by the technique similar to the technique shown in FIGS. 6A and 6B.

Next, the processing executed by the controller 50 shown in FIG. 3 will be explained.

Figure 7:
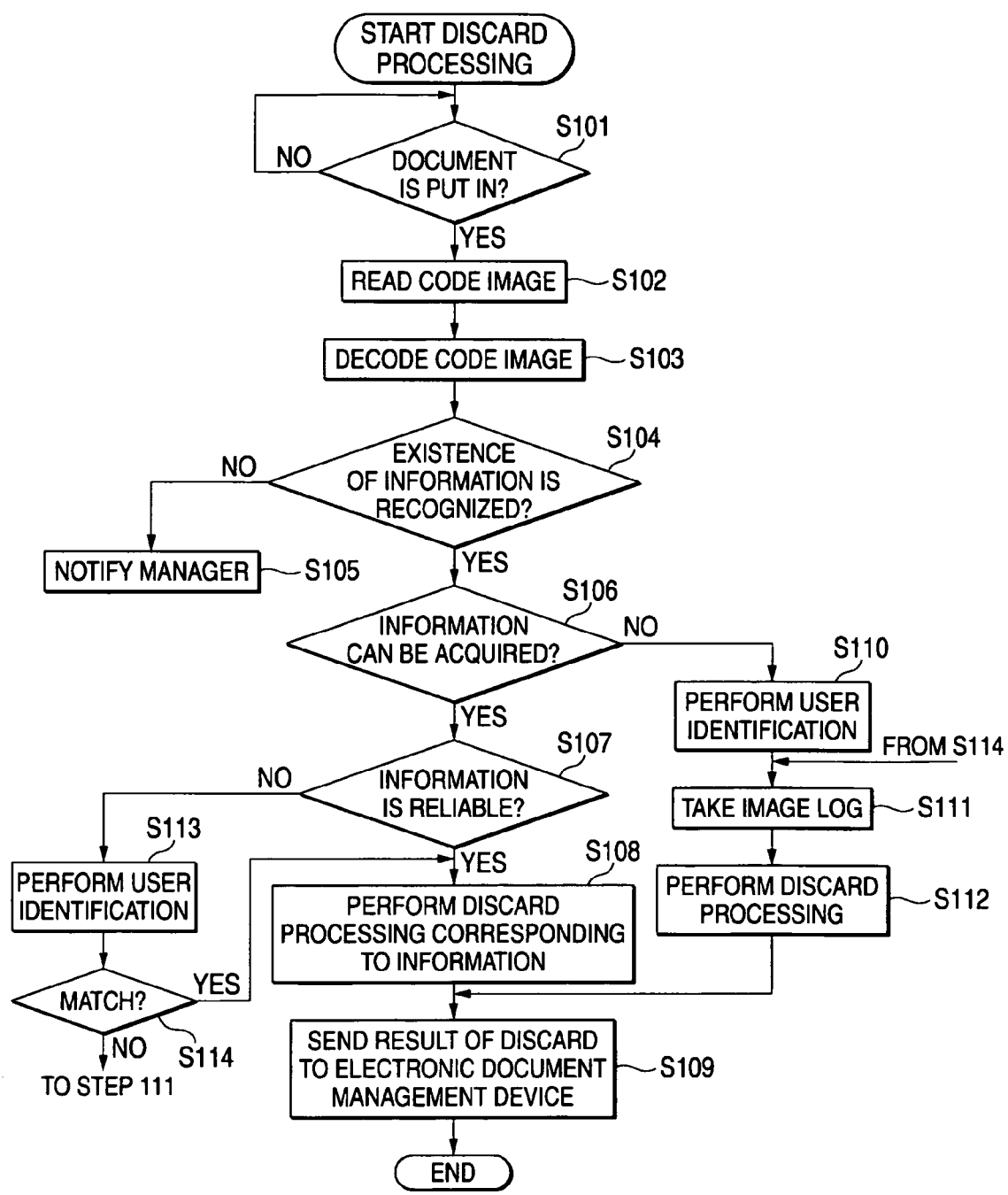
FIG. 7 is a flowchart showing processing executed mainly by a controller.

FIG. 7 is a flowchart showing the processing executed mainly by the controller 50. In the discard processing, first, it is judged whether or not a document (medium which a user wants to discard) is put in the discard sheet tray 34 shown in FIG. 3, in accordance with an output from the sheet sensor 35 via the mechanism controller 39 (step 101). The processing waits until a document is put therein. When a document is put therein, a code image is read by the code image reading unit 51 in accordance with an output from the area sensor 41 (step 102). After that the code image is decoded by the code image decoding unit 52 (step 103). The code information analysis unit 53 judges whether or not there is information such as identification information and attribute information (step 104). If the existence of such information is not recognized, a manager that manages the electronic document management system including the discard processing device 30 is notified of the fact that discard of the document in which the existence of the information cannot be recognized is requested, via the communication processing unit 56 (step 105). That is, an alarm is given. Then, discard is not performed until an instruction to take a certain action is issued. This notification to the manager can also be made by display output on the control panel 33 shown in FIG. 2.

If the existence of information such as identification information and attribute information can be recognized (that is, if it is recognized that the information exists) at step 104, it is judged whether these identification information and attribute information can be acquired or not (step 106). If the information can be acquired, it is judged whether the information is reliable or not (step 107). If a level is reached at which the information can be judged to be reliable, the analysis processing controller 55 performs discard processing corresponding to the information (step 108). The discard processing corresponding to the information includes management of a discard log, specification of the discard processing device 30 that performs discard, specification of the user who executed discard processing, management corresponding to the discard period and the like, as in the above-described example. The contents of the discard processing instruction are recognized, for example, by using the identification information and attribute information, and discard processing is performed in accordance with the information. After that, the result of the discard is sent to the electronic document management device 10 (see FIG. 1) via the communication processing unit 56 (step 109), and the processing ends.

Meanwhile, if it is recognized that identification information and attribute information exist (or probably exist) but the information cannot be acquired at all at step 106, the user identification processing unit 59 performs user identification (step 110). The user identification includes, for example, displaying on the control panel 33 a request for input of user ID from the user, and recognizing the input of ID from the user. If a card reader or the like is provided, a technique of user identification based on various cards can be employed. After the user identification is performed at step 110, the mechanism controller 39 is controlled to open the gate 36 and to start feeding by the feeder 37. Then, under the control of the document image reading unit 54, a document image is read by the first line sensor 43 and/or the second line sensor 44, and the read document image is compressed and stored into the document image storage unit 60, thus taking an image log (step 111). In this case, the analysis processing controller 55 generates, for example, new identification information and stores the new identification information together with the date and time of the discard, ID of the user in charge of the discard and the like, into the document image storage unit 60. Instead of storing to the document image storage unit 60, it is possible to send the document image to the electronic document management device 10 via the communication processing unit 56 and store the document image together with the management information into the electronic document information storage unit 15 in the electronic document management device 10. In this case, it is also possible to store only the document image into the electronic document DB 5 and store only the identification information and discard information to the electronic document information storage unit 15. After the operation to take the image log is performed at step 111, the discard processing device 30 performs discard processing (step 112), and the processing shifts to step 109.

If it is correctly recognized that the identification information and attribute information exist and the information is acquired to a certain extent but a level is not reached at which the data can be judged to be reliable at step 107, user identification is performed (step 113). The specific processing of user identification is similar to step 110. Here, the analysis processing controller 55 judges whether the result of the user identification matches uncertain information or not (step 114). If they match, the processing shifts to step 108 and discard processing corresponding to the information is performed. If they do not match, the processing shifts to step 111 and discard processing is performed after an image log is taken.

In the above embodiment, the analysis of the identification information and attribute information is executed mainly by the controller 50 of discard processing device 30. However, principal parts of the processing shown in FIG. 7 can also be executed by the electronic document management device 10 shown in FIG. 1. For example, after the coded image is read by the area sensor 41 shown in FIG. 3, the information related to the read code image is sent from the communication processing unit 56 to the electronic document management device 10 via the network 1. After the communication processing unit 11 of the electronic document management device 10 acquires the information related to the code image, for example, the code information analysis unit 14 executes the processing of step 103 and the subsequent steps in FIG. 7. For example, the code information analysis unit 14 decodes the code image (step 103) and recognizes the existence of information (step 104). If the existence of information cannot be recognized here, the discard processing device 30 is notified of this by the communication processing unit 11 via the network 1. If the information cannot be acquired at step 106, the discard processing device 30 is notified of this by the communication processing unit 11 via the network 1, and the discard processing device 30 executes the processing of step S110 and the subsequent steps. In this case, the image of the electronic document acquired by the discard processing device 30 is acquired by the communication processing unit 11 from the discard processing device 30 via the network 1 and is stored into the electronic document information storage unit 15 under the control of the electronic document management unit 12. If the information is not reliable at step 107, the discard processing device 30 is similarly notified of this by the communication processing unit 11 via the network 1, and the discard processing device 30 executes the processing of step 113 and the subsequent steps. On the other hand, if the information is reliable at step 107, analysis of the information is executed and the discard processing device 30 is instructed to perform discard processing corresponding to the information. In this manner, the control related to the discard processing can be executed by the electronic document management device 10 via the network 1. In this case, the document discard processing according to this embodiment can be realized even if the construction of the discard processing device 30 is simplified.

As described above in detail, according to these embodiments, in the case that identification information such as document ID, particular attribute information and the like cannot be correctly read with respect to a document (medium) which the discard processing device 30 such as shredder is requested to discard, different processing can be executed in accordance with the reading level. Generally, unlike a document image (document) of an electronic document, it is required that a code image of identification information and attribute information should not disturb the document image. A code image is often embedded in a less perceptible manner in view of security. Because of such characteristics of a code image, there is a high possibility that particularly code information cannot be correctly read from a document including a code image. However, according to the above embodiment, discard processing with improved user-friendliness can be realized even if information cannot be correctly read.

Various other codes can be used other than the code system described in the above embodiment. These include, for example, bar code or various two-dimensional codes. In printing code information, other than the invisible toner, colored toner or colored ink (YMCK) may be used, or toner or ink having low visibility with respect to ultraviolet rays or the above-described infrared rays may be used. For example, code information may be formed in less perceptible yellow (Y). Moreover, various techniques may be employed such as reading characters by OCR or embedding hidden information. To a document to which such a code is employed, the above embodiment can also be applied even if the code cannot be correctly read before discarding the document.

As described above, some embodiments of the invention are outlined below.

In the electronic document management system according to an aspect of this invention, a code image is read by a reading unit from a document in which the code image is formed, and code information is analyzed from the read code image by an analysis unit. Then, a discard processing unit performs control to execute discard processing of the document if the code information is correctly analyzed by the analysis unit, and not to execute discard processing of the document if the code information is not correctly analyzed.

According to another aspect of the invention, the case that the code information is not correctly analyzed may be at least one of a case that the existence of the code information cannot be recognized, a case that the existence of the code information can be recognized but the information cannot be acquired, and a case that a level is not reached at which data of the read code information can be judged to be reliable.

According to another aspect of the invention, the code information may include one of identification information of an electronic document to be a basis of a document image on the document and identification information of a medium constituting the document. According to another aspect of the invention, the case that the code information is not correctly analyzed may be a case that the identification information cannot be recognized.

According to another aspect of the invention, the analysis unit may analyze attribute information related to the document included in the code information. The attribute information analyzed by the analysis unit may include information related to discard management of the document. According to another aspect of the invention, the discard processing unit may execute discard processing after identifying a user who wishes discard processing, in the case that the code information is not correctly analyzed.

The reading unit may read a document image from the document, and the discard processing unit may discard the document after storing the document image read by the reading unit into a memory, in the case that the code information is not correctly analyzed. Thus, document recognition may be carried out using an image log even after the discard.

According to another aspect of this invention, the discard processing device that performs discard processing of a medium on which a document image is formed may include: a sensor that reads a code image formed on the medium; a discard processing unit that performs discard processing of the medium; and a controller that analyzes code information from the code image read by the sensor, and in a case that the code information is not correctly analyzed, executes processing different from processing executed in a case that the code information is correctly analyzed.

According to another aspect of the invention, the case that the code information is not correctly analyzed may be one of identification information selected from identification information of an electronic document to be a basis of a document image and identification information of the medium cannot be recognized.

According to another aspect of the invention, the case that the code information is not correctly analyzed by the controller may be a case that attribute information related to discard included in the code information cannot be correctly recognized. Moreover, the attribute information related to discard may be information related to the possibility of discard of the medium or information for management in accordance with discard period.

Moreover, the different processing executed by the controller may be processing in accordance with analysis level of the code information.

Also, the different processing executed by the controller may be processing not to execute discard, or discard processing after identifying a user.

According to another aspect of this invention, the document discard processing method may include: reading a code image formed on a document; analyzing code information from the read code image; executing specified document discard processing in a case that the code information is correctly analyzed, and executing processing different from the specified document discard processing in a case that the code information is not correctly analyzed; and reading a document image formed on the document. Executing processing different from the specified document discard process may be to execute document discard processing after storing information of the read document image into a memory in the case that the code information is not correctly analyzed.

Also, executing processing different from the specified document discard process may be to execute processing to identify a user in the case that the code information is not correctly analyzed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-250291 filed on Aug. 30, 2005 including specification, claims, drawings and abstract is incorporated herein by reference in its entirety.

What is claimed is:

1. An electronic document management system adapted for use with an operator comprising:
 a reading unit that reads a code image from a document in which the code image is formed;
 an analysis unit that analyzes code information from the code image read by the reading unit; and
 a discard processing unit that executes discard processing of the document if the code information is correctly analyzed by the analysis unit, and executes processing different from the discard processing of the document if the code information is not correctly analyzed; wherein
 different processing is adapted to enable operator intervention; and
 a processing result when the code information is correctly analyzed is sent to an electronic document management device via a communication processing unit without operator intervention.

2. The electronic document management system as claimed in claim 1,
 wherein the case that the code information is not correctly analyzed is at least one of a case that the existence of the code information cannot be recognized, a case that the existence of the code information can be recognized but the information cannot be acquired, and a case that data of the read code information is not judged to be reliable.

3. The electronic document management system as claimed in claim 1,
 wherein the code information includes one of identification information of an electronic document to be a basis of a document image on the document and identification information of a medium constituting the document, and the case that the code information is not correctly analyzed is a case that the identification information cannot be recognized.

4. The electronic document management system as claimed in claim 1,
 wherein the analysis unit analyzes attribute information related to the document included in the code information.

5. The electronic document management system as claimed in claim 4,
 wherein the attribute information analyzed by the analysis unit includes information related to discard management of the document.

6. The electronic document management system as claimed in claim 1,
 wherein the discard processing unit executes discard processing after identifying a user who wishes discard processing, in the case that the code information is not correctly analyzed.

7. The electronic document management system as claimed in claim 1,
 wherein the reading unit reads a document image from the document, and the discard processing unit discards the document after storing the document image read by the reading unit into a memory, in the case that the code information is not correctly analyzed.

8. A discard processing device adapted for use with an operator that performs discard processing of a medium on which a document image is formed comprising:
 a sensor that reads a code image formed on the medium;
 a discard processing unit that performs discard processing of the medium; and
 a controller that analyzes code information from the code image read by the sensor, and in a case that the code information is not correctly analyzed, executes processing different from processing executed in a case that the code information is correctly analyzed; wherein
 different processing is adapted to enable operator intervention; and
 a processing result when the code information is correctly analyzed is sent to an electronic document management device via a communication processing unit without operator intervention.

9. The discard processing device as claimed in claim 8,
 wherein the case that the code information is not correctly analyzed is one of identification information selected from identification information of an electronic document to be a basis of the document image and identification information of the medium cannot be recognized.

10. The discard processing device as claimed in claim 8,
 wherein the case that the code information is not correctly analyzed by the controller is a case that attribute information related to discard included in the code information cannot be correctly recognized.

11. The discard processing device as claimed in claim 8,
 wherein the attribute information related to the discard is information related to the possibility of discard of the medium.

12. The discard processing device as claimed in claim 8,
 wherein the attribute information related to the discard is information for management in accordance with discard period.

13. The discard processing device as claimed in claim 8,
 wherein the different processing executed by the controller is processing in accordance with analysis level of the code information.

14. The discard processing device as claimed in claim 8, wherein the different processing executed by the controller is processing not to execute discard, or discard processing after identifying a user.

15. A document discard processing method comprising:
reading a code image formed on a document;
analyzing code information from the read code image; and
executing specified document discard processing in a case that the code information is correctly analyzed, and
executing processing different from the specified document discard processing in a case that the code information is not correctly analyzed; wherein
different processing is adapted to enable operator intervention; and
a processing result when the code information is correctly analyzed is sent to an electronic document management device via a communication processing unit without operator intervention.

16. The document discard processing method as claimed in claim 15, further comprising reading a document image formed on the document,
wherein executing processing different from the specified document discard process is to execute document discard processing after storing information of the read document image into a memory in the case that the code information is not correctly analyzed.

17. The document discard processing method as claimed in claim 15,
wherein executing processing different from the specified document discard process is to execute processing to identify a user in the case that the code information is not correctly analyzed.

* * * * *